C. REDFIELD.
CONTROLLING MECHANISM FOR ELECTRIC MOTORS.
APPLICATION FILED JUNE 15, 1915.

1,240,877.

Patented Sept. 25, 1917.
5 SHEETS—SHEET 1.

Witnesses
Fenton S. Belt

Inventor
Cleveland Redfield
By
Attorney

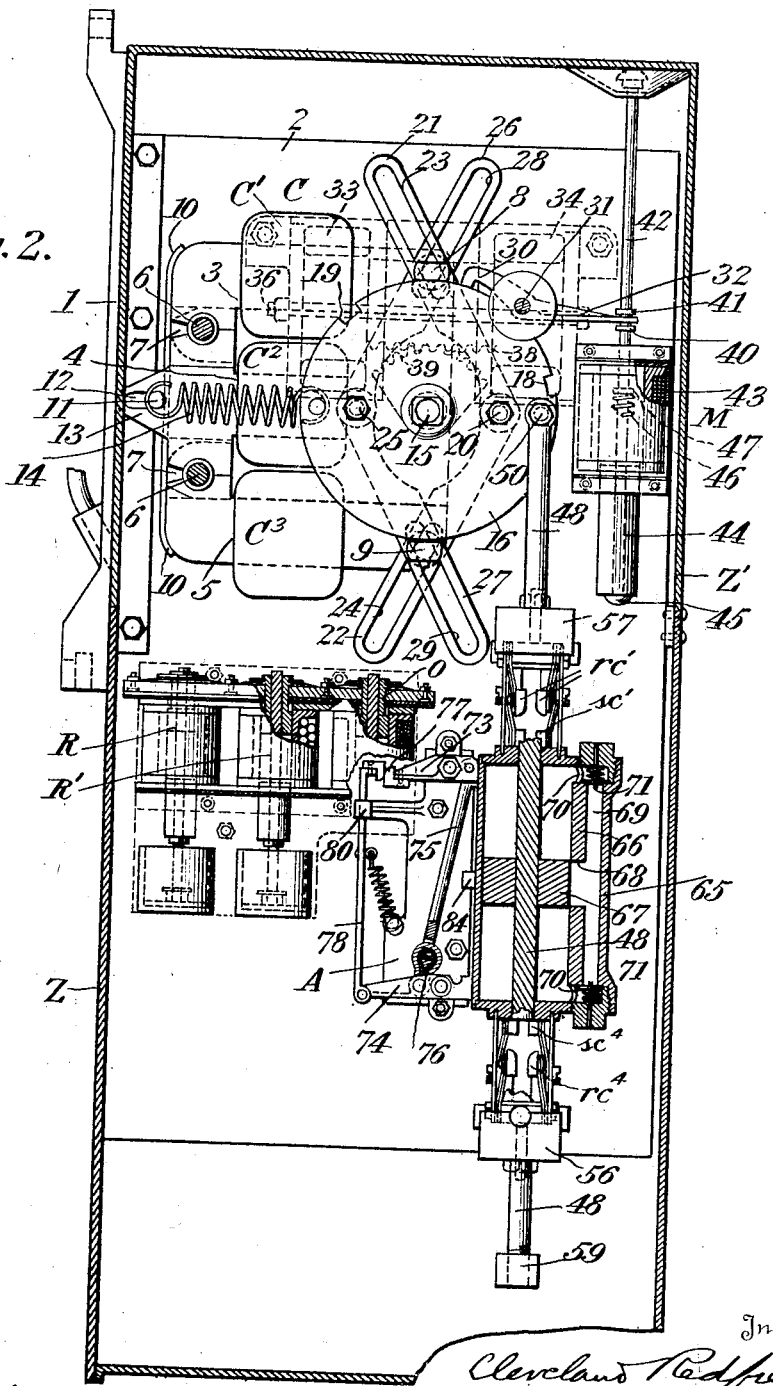

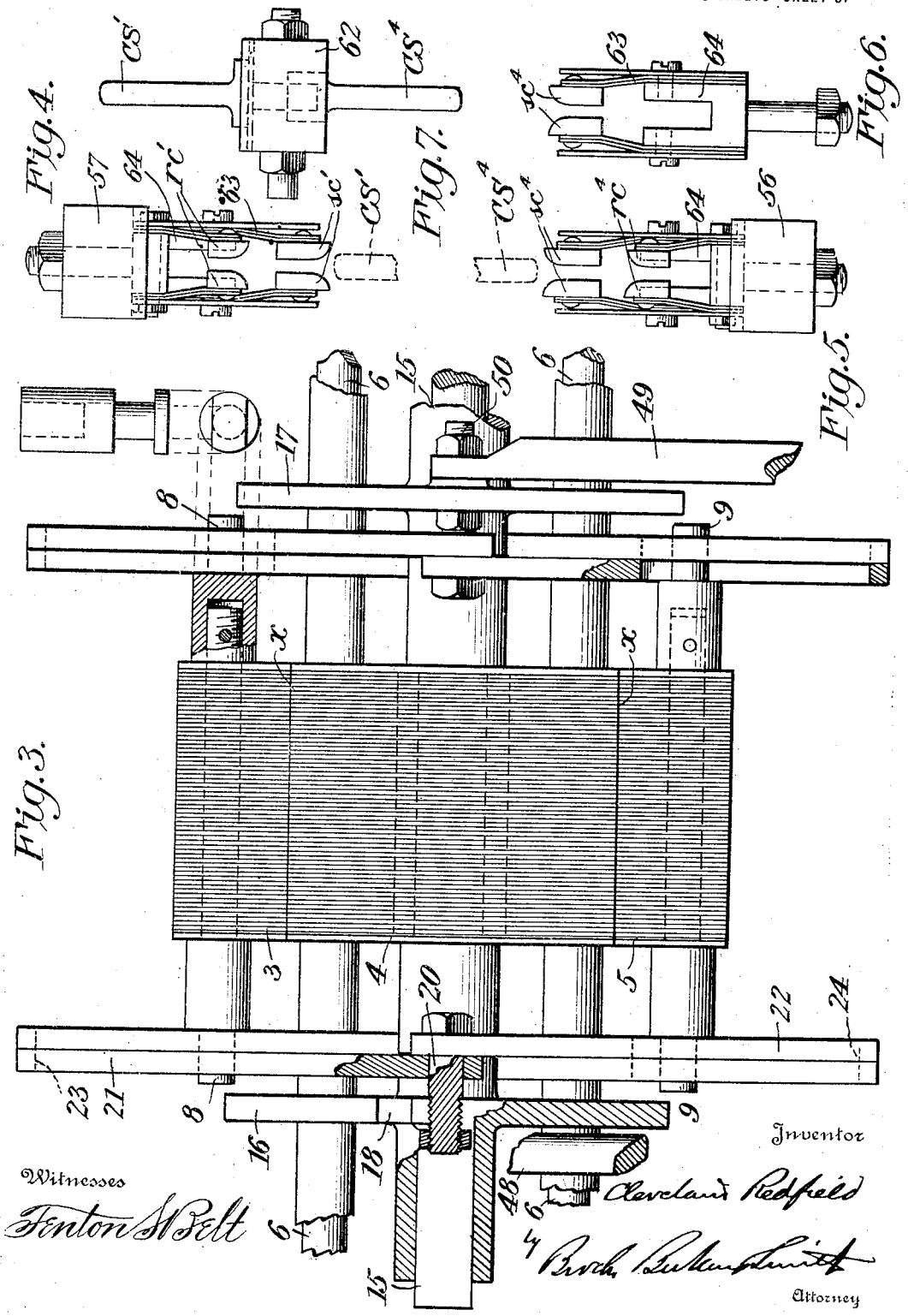

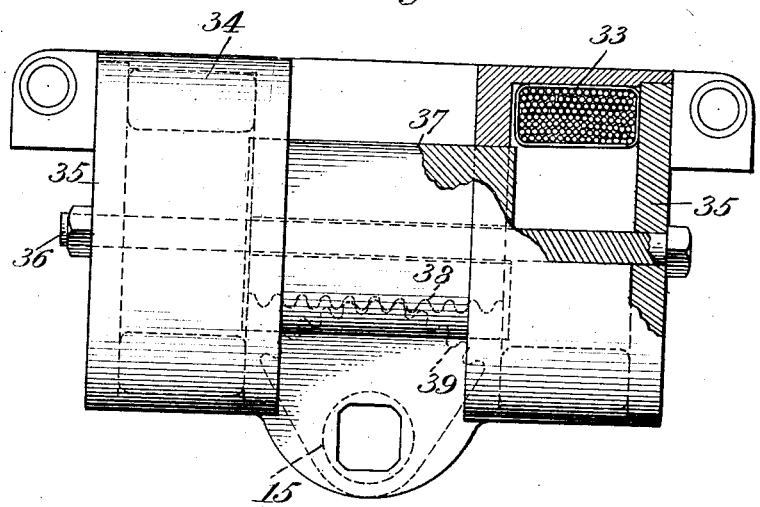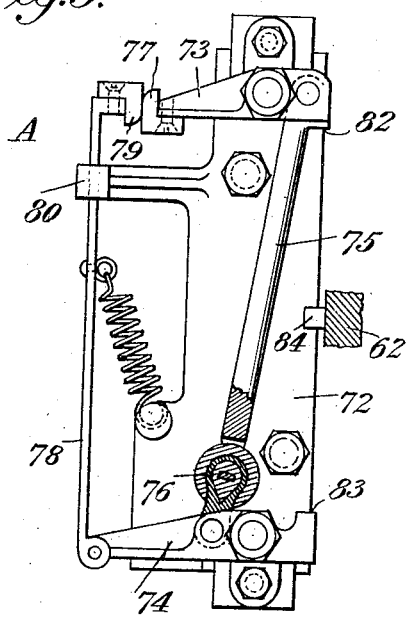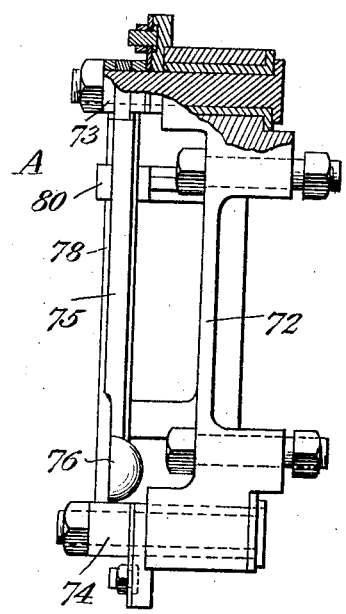

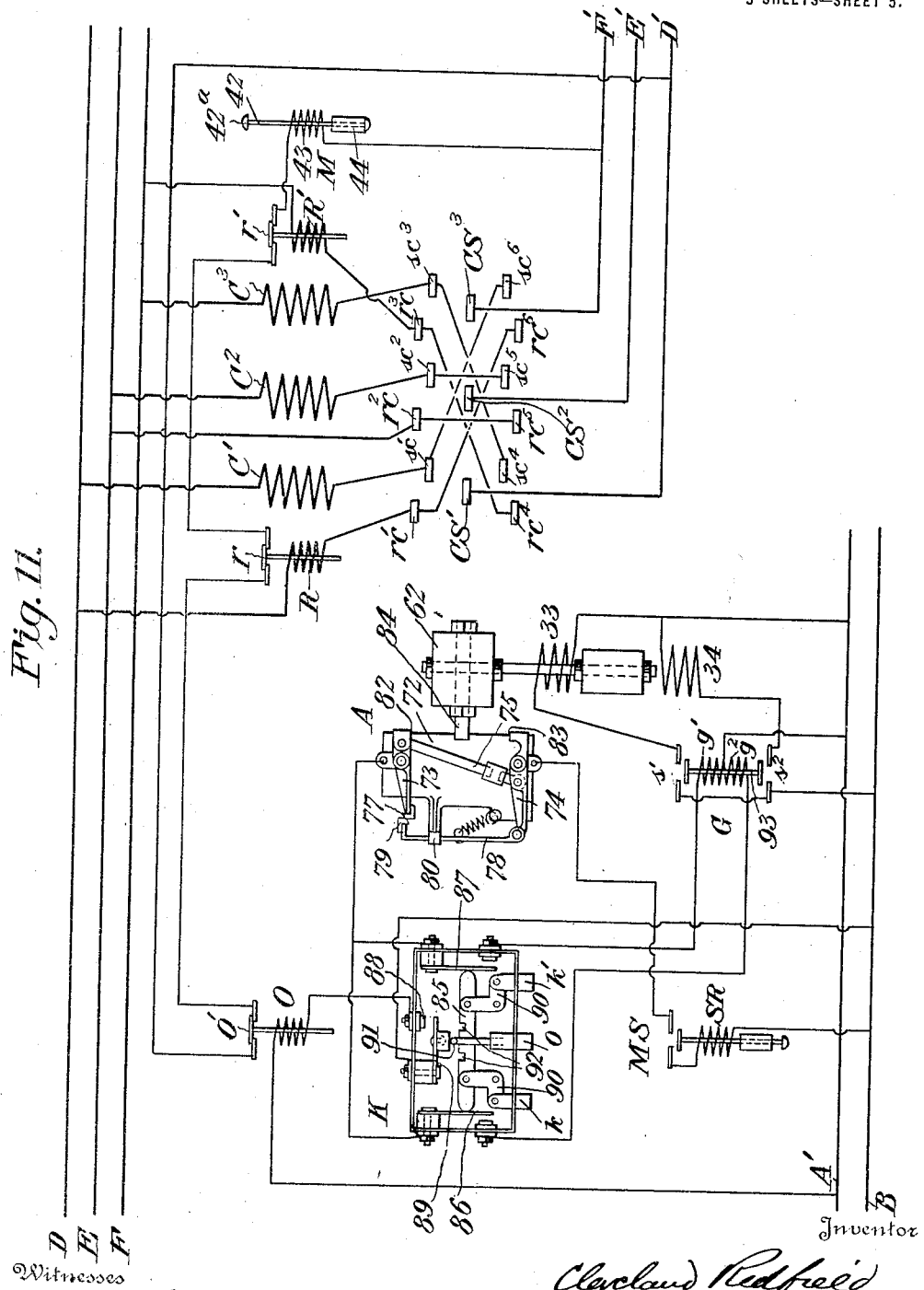

UNITED STATES PATENT OFFICE.

CLEVELAND REDFIELD, OF OGDEN, UTAH.

CONTROLLING MECHANISM FOR ELECTRIC MOTORS.

1,240,877.   Specification of Letters Patent.   Patented Sept. 25, 1917.

Application filed June 15, 1915. Serial No. 34,168.

*To all whom it may concern:*

Be it known that I, CLEVELAND REDFIELD, a citizen of the United States, residing at Ogden, Utah, have invented certain new and useful Improvements in Controlling Mechanism for Electric Motors, of which the following is a specification.

This invention relates to controlling mechanism of the general type disclosed in my previous pending application, Serial Number 801,835, filed November 19, 1913, for controlling mechanism for alternating machines. Said application describes a structure including compensating coils combined with a variable magnetic circuit, starting and running contacts, means for varying the magnetic circuit in proper relation to the establishing of the starting and running contacts, a controlling magnet and overload relays. Said application also describes various mechanical features and, particularly, mechanical means for manipulating the electric devices in starting and stopping. Reference should be made to said application for details not contained herein.

The present invention provides in addition to the essential structural features and mode of operation of the said previous invention, a motor device for effecting the necessary operations; controlling means which may be adapted for remote control, that is for control of the apparatus from a distant station; simplified mechanical construction comprising a simplified timing device or means for controlling the rapidity of movement of parts during the starting operation; means for controlling a reversible motor, that is for properly controlling the starting and stopping of the motor in either direction of running; and other features which will be sufficiently described hereinafter.

The accompanying drawings illustrate one exemplifying embodiment of the invention, but it is to be understood that the invention is capable of many modifications, and I do not limit myself to details, except as claimed hereafter:

Fig. 2 is a left side elevation of the same.

Fig. 3 is a front, enlarged detail of the compensator-core structure and certain associated parts, some parts being shown in section.

Figs. 4 and 5 are end views of the starting and running contact fingers mounted on their respective insulating bars.

Fig. 6 is a detail of one pair of starting contact fingers.

Fig. 7 is an end view of the contact shoes mounted on their movable carrying bar.

Fig. 8 is an enlarged detail, partly in section, of the starting motor device, or solenoids.

Fig. 9 is an enlarged detail of auxiliary switch A in the position of Fig. 2.

Fig. 10 is a view of the same, partly in section, from the position of Fig. 1.

Fig. 11 is an electrical and circuit diagram, including certain mechanical and electrical features not shown in other views.

Figure 1:
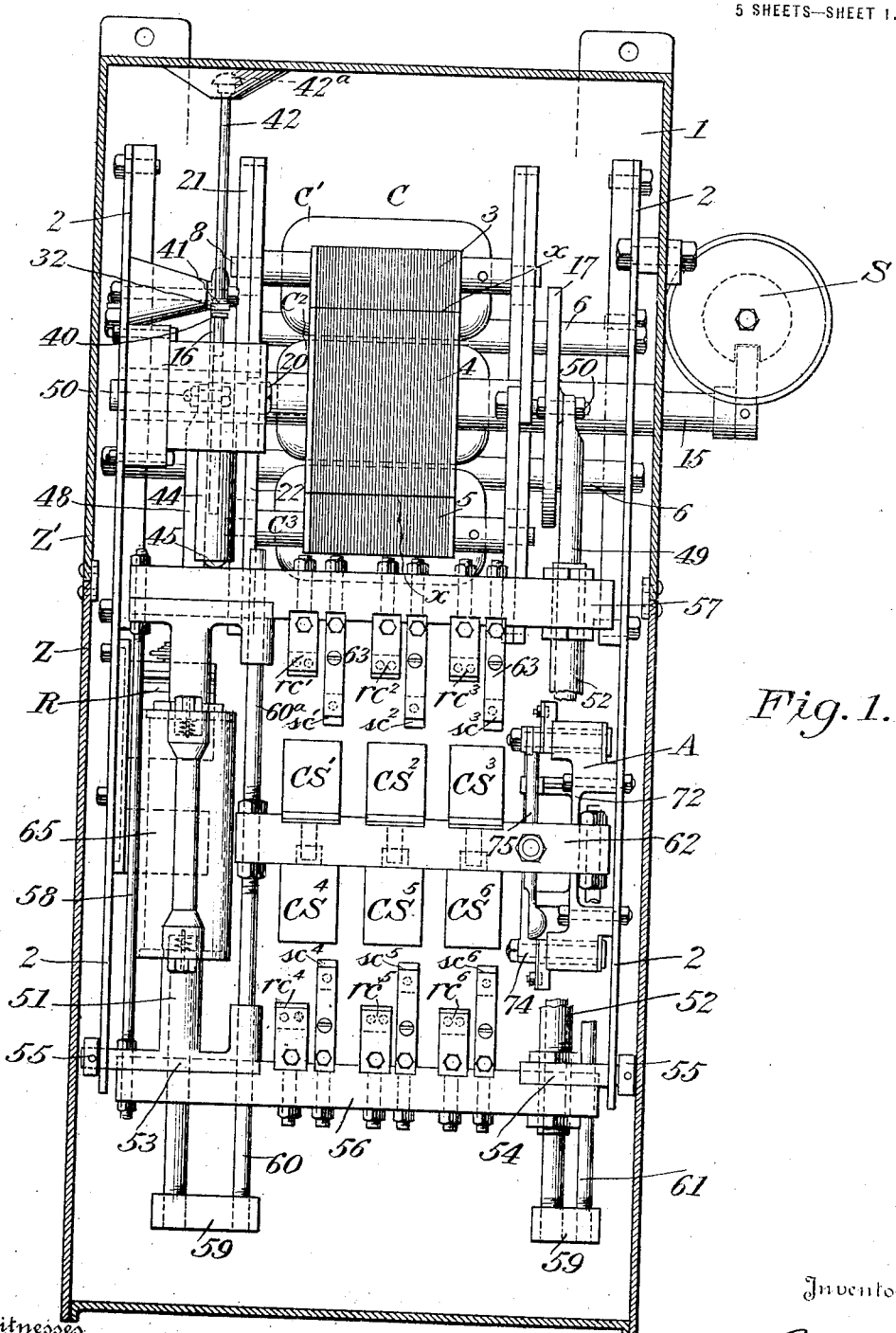
Figure 1 is a front elevation of starting mechanism embodying principal parts of the invention, some parts, however, such as the distant controlling switch and other parts not being shown in this view.

Referring to Figs. 1, 2 and 3, base 1 carries side plate 2 for the support of certain parts of the mechanism. The compensator, designated as a whole by C, is located between these side plates and comprises composite or laminated core pieces 3, 4 and 5, of which the middle section 4 is stationary. Core members 3 and 5 are movable in relation to member 4 to establish and vary air gaps along the lines $x$ for varying the magnetic circuit through the core pieces. Hinge shafts 6 connected with the side plates 2 support the core pieces in the above described movable relation to each other. The hinge connections of the core pieces upon the hinge shafts are provided by interleaving alternate laminæ of the adjacent core members and by cutting away parts of the laminæ at 7, as fully described in the above-mentioned application. Operating pins 8, 9, pass through the outer ends of the movable core sections 3 and 5. The movable core sections are urged to closed position by a plate 10 resting against the backs thereof, together with a rod 11, which lies against the plate and is guided by slots 12 in ears or extensions 13 of two or more of the laminæ of core section 4. To the ends of this rod 11 are connected one end of each of springs 14, and the other end of each spring is connected to an operating disk mentioned hereafter. An operating shaft 15 mounted in suitable bearings passes through the outer end of stationary core member 4 and is provided with disks 16 and 17, at least one of which, as 16, is provided with detent notches 18 and 19. Pivoted upon stud 20, on disk 16, are links 21 and 22, provided, respectively, with slots 23 and 24, coöperating with core pins 8 and 9, respectively. Pivoted upon stud 25, on the same disk, are links 26 and 27, provided with slots 28 and 29, respectively, coöperating, respectively, with core studs 8 and 9. The mechanism will be operative with one set of links as just described, but evidently, the links may be duplicated for each of the disks, and are so shown in the drawing. A latch 30, pivoted at 31, is provided for disk notches 18 and 19, and this latch has an arm 32, by which it is actuated, as will be described later.

Compensating coils $C'$, $C^2$, $C^3$ are wound upon core pieces 3, 4 and 5, respectively.

The core pieces are to be actuated through shaft 15, and the disks and links above described, by a motor device shown in detail in Fig. 8, comprising solenoids 33 and 34, secured to one of the side plates 2. These solenoids have removable end plates 35 secured by a center bolt 36, and this also provides a guide for solenoid armature or plunger 37. This plunger is provided with a rack 38, engaging a segment gear 39 fastened upon operating shaft 15. Evidently, when the appropriate solenoid is energized, as will be later described, the rack gearing moves shaft 15 in the appropriate direction. Supposing the shaft is moved counterclockwise in Fig. 2, links 21 and 27 will then, through their slots 23 and 29, actuate pins 8 and 9 of cores 3 and 5, respectively, it being especially noted that said slots are arranged so that during the first movement of the disk the core pieces will not be moved but the clearance between the pins and ends of the link slots will first be taken up, this preliminary movement of the disks without actuating the core members being provided for the purpose of first establishing the starting contacts, as will later be described.

When said clearance has been taken up, the continued movement of the disks and links moves the free ends of core pieces 3 and 5 farther away from contact with the fixed core piece 4, thus establishing and increasing air gaps in the magnetic circuit of the compensator until the disks reach the intended limit of their travel, which is indicated in the present example by notch 18 coming opposite latch 30.

Latch arm 32, above mentioned, engages between lugs 40 and 41 on controlling magnet-stem 42. This stem passes through a controlling magnet or solenoid 43. The controlling magnet as a whole is designated in Fig. 11 as M. On the stem within the solenoid is mounted loosely an armature 44, which ordinarily engages head 45 at the lower end of the stem. When the solenoid is energized, this armature first rises without moving the stem until it encounters a spring 46 abutting against lug 47 on the stem. The stem is thus raised and latch 30 yieldingly held against the edge of the disk 16 ready to engage either of the notches when it comes opposite the latch.

The above described movement of disks 16 and 17 is also utilized to actuate starting and running contacts, the mechanism of which will now be described:

Rods 48, 49 are connected to disks 16, 17, at pivot points 50. These rods pass through sleeves 51, 52. The sleeves form parts of, or are connected to, fittings 53, 54, respectively, and these fittings are provided with trunnions or pivot studs 55 having bearings in plates 2. The fittings are connected to an insulating contact carrying bar 56. Sleeves 51 and 52 extend upwardly and are connected by suitable fittings with another insulating contact carrying bar 57, and a rod 58 may also connect said bars 56 and 57. In this way, the said contact bars are spaced fixedly apart and a frame is provided comprising the sleeves and bars, this frame being pivoted at 55 so that the upper end swings in accordance with the movement of the disks and rods 48, 49. Said rods are connected by suitable fittings 59 with rods 60, 61, which pass through and are suitably guided in bar 56 and are connected with a movable insulating contact carrying bar 62. An extension $60^a$ of rod 60 may also be suitably guided in bar 57.

Bar 57 carries starting contacts $sc'$, $sc^2$ $sc^3$ and running contacts $rc'$, $rc^2$, $rc^3$. Bar 62 carries contact shoes $CS'$, $CS^2$, $CS^3$, each of which coöperates with an opposite starting and running contact. For example, contact shoe $CS'$ coöperates with contacts $sc'$, $rc'$.

Bar 56 carries starting contacts $sc^4$, $sc^5$, $sc^6$ and running contacts $rc^4$, $rc^5$, $rc^6$, and bar 62 carries contact shoes $CS^4$, $CS^5$, $CS^6$ to coöperate with the last mentioned starting and running contacts in an obvious manner. Figs. 4 to 7 inclusive are enlarged views looking toward the ends of the bars and showing the contacts and contact shoes in operative relation to each other. The starting contacts $sc'$, etc., are carried on spring fingers 63 and these fingers are in turn secured to a suitable slotted head 64 so that the starting contact fingers are first engaged by the appropriate contact shoe $CS'$, for example, and as the shoe slides between the starting contacts it later engages with the running contacts. These running contacts rc', etc., are carried by spring fingers 63 secured to a suitable fitting in such position that they are relatively within or farther away from the contact shoes than the starting contacts.

In the previously described movement of the disks 16, 17, therefore, the movable contact bar 62 is immediately moved and engages one set of contact shoes; for instance, those on the upper side of the bar, first with the adjacent starting contacts $sc'$, $sc^2$, $sc^3$. This engagement takes place while the ends of link slots 23 and 29 are approaching pins 8 and 9, as above described, and the starting contacts are, therefore, established while the magnetic circuit of the compensator is closed. When the slot clearances are taken up, gaps are established in the magnetic circuit and are widened as the contact shoes $CS'$, etc., slide between the starting contacts $sc'$, etc., until finally at about the moment the magnetic circuit is opened to the limit, the contact shoes engage the running contacts $rc'$ to establish the running circuits, and at about this moment one of the disk notches, for instance, notch 18, is engaged by latch 30, and all parts are held in running position until released in one of the ways which will be later described. When released, the parts operate in reverse sequence, the running contacts first being broken while the magnetic circuit is fully open; the magnetic circuit is progressively closed, and when closed the starting contacts are broken. Mechanically movable parts are moved from running to off position by previously mentioned springs 14 connected to disks 16 and 17, by means of pins or studs thereon.

To suitably retard and regulate the speed of movement of the parts in the starting operation, suitable means are provided, represented in this embodiment by a dash pot 65, Fig. 2. This comprises a cylinder 66 surrounding one of the rods, for instance rod 48 of the contact mechanism, and secured to the rod is a piston 67. In off position, this piston is opposite a port 68. This port leads to a by-pass 69 communicating at each end with the cylinder through ports 70 controlled by check valves 71 apertured to permit relatively slow passage of the oil, grease or other checking medium from the cylinder to the by-pass when the piston is moved toward either end of the cylinder. In the return movement of the piston toward center position the check valves open freely, permitting return of the checking medium rapidly from the by-pass to the appropriate end of the cylinder. Suitable adjusting devices may be provided, which it is not considered necessary to show in detail, for regulating the checking action of the dash-pot. Evidently, other suitable retarding means than the dash-pot shown may be employed when desirable. The dash-pot suitably retards the movement of the mechanical parts above described, so that in starting in either direction the motor or other electrical device controlled by the apparatus is protected and brought up to running speed in a safe but positive manner.

An auxiliary switch, designated as a whole by A (Figs. 1, 2, 9 and 10), is desirably employed. This comprises a base 72 on which arms 73, 74 are pivoted. These arms are connected to move together but in opposite directions by a link 75, in which an insulating connection 76 is interposed. Arm 73 carries a contact piece 77. Arm 74 is pivotally connected to a rod 78, which carries the other contact piece 79 coöperating with 77. Rod 78 is suitably guided by part 80 of the base. A spring, tensioned between the base and rod 78, normally holds the parts in closed circuit position, as shown in Fig. 9, and this is the normal condition of the auxiliary switch when the whole apparatus is in off position. Arms 73 and 74 have shoulders 82, 83, respectively, to be engaged by a stud 84 carried by a movable contact bar 62. Toward the end of the starting operation, in either direction, stud 84 encounters shoulder 82 or 83, and in either case this moves contact pieces 77 and 79 quickly apart to break the circuit in which the auxiliary switch A is located, for a purpose to be described. Suitable insulation and binding posts for the switch are indicated, but do not require special description.

In Figs. 1 and 2, overload relays R, R' are shown, also an operating switch or relay O, and the essential electrical parts of these devices are designated by the same characters in a diagrammatic way in Fig. 11.

Fig. 11 shows a controlling or interlocking switch K comprising a connecting link 85, contacts 86 and 87 for starting, a contact 88 for stopping, a spring 89, which in this embodiment is also a part of the stopping contact 88, bell cranks 90 connecting starting buttons $k$, $k^1$ with link 85, a stopping button $o$, the stem whereof has an offset or head 91 engaging against spring 89 and also adapted to engage detent notches 92 in link 85.

G designates a relay coil or solenoid, not shown in the mechanical views, for the purpose of controlling the circuit of the starting solenoids 33 and 34. This relay G is employed in a preferred construction, but it may be dispensed with in many cases, as will be later explained. Solenoid G has two parts $g^1$, $g^2$, to actuate core 93, which in turn controls switches $s^1$, $s^2$. Stopping relay O controls a normally closed switch $O^1$.

Overload relay R controls a normally closed switch $r$ and overload relay $R^1$ controls normally closed switch $r^1$.

The main operating switch K when intended for distant control is, of course, located at the distant control station, and in this case the master switch MS would be similarly located. Otherwise, switch K and the master switch may be located adjacent to the rest of the starting mechanism.

To start the motor controlled by the apparatus in one direction, the master switch MS is first closed by pressing a button provided for that purpose. Starting button $k$ is then pressed. This moves connecting link 85 to the right where it is held by detent 91 engaging the appropriate notch 92. Or, the desired starting button, such as $k$, may first be pressed and then the master switch closed by pressing its button. A circuit is thus established from line B of the controlling circuit through safety relay SR and the master switch to the auxiliary switch A which is normally closed; to contact 87, to section $g^1$ of solenoid G, thus closing switch $s^1$, thence to line A of the controlling circuit. The closing of switch $s^1$ establishes a circuit from line B through the switch to starting solenoid 33 and so back to line A. Solenoid 33 being energized operates the mechanical devices previously described to raise contact bar 62. Circuits are thus established from main line D through compensator coil $C^1$, contact shoe $CS^1$, and then to line $D^1$; also from line E to compensator coil $C^2$, to contact shoe $CS^2$ and to line $E^1$; also from line F to compensator coil $C^3$, contact shoe $CS^3$ to line $F^1$. At this moment the magnetic circuit of the compensator is closed and the motor receives suitable small starting current. The closing of the starting contacts $sc^1$, $CS^1$, etc., establishes a circuit from the motor side of main line $D^1$ through switch $o^1$ to switch $r$, to switch $r^1$, to magnet M, and so back to the motor side of line $F^1$. This energizing of magnet M attracts core piece 44 which rises on its stem and urges detent 30 to active engagement with disk 16.

The movement of the contact bar 62 continues with suitable regulation by the dash pot, this movement serving to establish and gradually widen air gaps in the magnetic circuit, and so to increase the current going to the motor through the starting contacts until running contacts are established, as follows: from line D through overload relay R to $rc^1$, to $CS^1$, to line $D^1$; from line E to $rc^2$, to $CS^2$, to line $E^1$. From line F through overload relay $R^1$, to $rc^3$, to $CS^3$, to line $F^1$. At this moment, the magnetic circuit is fully opened; and at about the same moment stud 84 strikes shoulder 82 and opens the auxiliary switch at A, thus breaking the controlling circuit and deënergizing solenoid 33. The direct connection now afforded in line E substantially eliminates compensator coil $C^2$, while overload relays R and $R^1$ are so designed as to take practically all of the current of lines D and F. Therefore, in running position, the compensator is substantially eliminated and the motor is now brought up to full speed. The controlling magnet M operates at all times substantially as described in my above mentioned application to protect the mechanism upon occurrence of abnormally low voltage. That is, whenever the voltage drops below a certain point, either during the starting operation or thereafter, the deënergizing of the coil M releases its armature and causes detent 30 to be retracted and thereupon all parts go to off position under the impulse of springs 14, the motor being protected, and arcing of the controller contacts being prevented, etc., as fully described in said application. The opening of the motor circuit takes place rapidly because in this operation the dashpot is inoperative, as previously described.

Upon reaching running position in either direction, the opening of auxiliary switch A breaks the operating circuit, including the safety relay SR and the deënergizing of this relay causes the master switch MS to open, thus breaking the operating circuit which can only be restored by closing the master switch. When the parts are going to off position, therefore, the closing of auxiliary switch A will have no effect on the power-actuated starting devices to interfere with the "off" movement. The breaking operation will also take place upon occurrence of an overload by the action of overload relays R, $R^1$, which will then open switches $r$, $r^1$, breaking the circuit which includes the controlling magnet M, whereupon the parts will operate as in any other case of breaking said magnet circuit.

The motor may also be stopped by pressing the button $42^a$ of stem 42 at the switchboard, whereupon the running detent 30 is released and switch $M^2$ is opened and the parts operate as previously described. The motor may also be stopped from the distant control station by pressing button $o$. This establishes a circuit from controlling line A' through solenoid O to contact 88, thence to line B. This energizing of solenoid O opens switch $o^1$ in the circuit of the controlling magnet M, and thereupon the parts operate as previously described.

The relay G with its adjacent parts is employed in some cases to avoid leading through the interlocking switch K the heavier current which would be otherwise required. Evidently, the solenoid G and its parts constitute a pilot circuit for operating the switches $s^1$, $s^2$ in the circuits of starting solenoids 33, 34, which require a heavier current. If, however, it is desired to eliminate relay G and its coöperating parts, this may be done by suitably designing the parts and connections of switch K.

The controlled motor may be started in the opposite running direction by pressing the other starting button $k^1$. The controlling circuit to solenoid 34 will thus be closed through contact 86 and the mechanical parts will operate in a direction opposite to that above described, but otherwise the action is similar and easily understood and the appropriate electrical circuits may be easily traced.

The arrangement of the circuit for the safety relay and master switch is important. As previously explained, this circuit leads to and from the operating lines A' and B, which preferably have a reduced voltage as compared with the main lines D, E, F. Therefore, when the master switch is placed with the interlocking switch K at a distant control station, it is only necessary to lead to this station suitable wiring for current of reduced voltage, and, similarly, the parts of the interlocking switch and the master switch with its safety relay may be of relatively lighter construction appropriate for such relatively low voltage. In other cases it would evidently be possible to utilize full line voltage for the safety relay and master switch as well as the interlocking switch by suitably designing the conductors and the mechanical parts.

The described arrangement of the safety relay and master switch with their circuit is important because the safety relay serves not only to properly operate the master switch but to indicate to the operator that the controlling mechanism has reached running position in either direction. Evidently, after pressing the appropriate button $k$ or $k^1$ and then depressing and releasing the master switch button, the master switch will remain closed with its button depressed so long as the safety relay is energized, that is, during the starting operation; but when the controller has reached full running position the safety relay will be deënergized by opening of the auxiliary switch A, and immediately the master switch will open and the movement of its button will indicate to the operator the completion of the starting operation.

In the complete invention as described, a motor device is used to effect the mechanical operations necessary, but evidently this motor device operates through shaft 15, which in its turn mechanically actuates parts intermediate it and the compensator, contact bar, etc. Evidently, in a simple embodiment of the invention, the motor device and its controlling part may be omitted and the parts may be operated mechanically through the shaft 15 or its equivalent, and in this case the speed of operation will be controlled by the dash-pot just as when operated by the motor. In some of the claims following, therefore, a mechanical operating device is defined and this is not contradictory because, as above explained, the mechanical operating device is included in the entire combination. Where a motor device is mentioned, it may, in a sense, be considered additional to the mechanical device which it actuates.

In Figs. 1 and 2, the parts are shown inclosed in a casing Z having a detachable upper part $Z^1$. The lower part Z extends up to the level of the upper running contacts and also incloses other switch devices, for instance, those controlled by the overload relays, etc., also the auxiliary switch A. This lower part of the housing may be filled with oil to prevent or reduce arcing at the contacts.

The relay G with its switches $s'$, $s^2$ may also be located in the oil chamber to break arcs at the switches. This may be desirable because a greater current passes through the switches $s^1$, $s^2$ than through the auxiliary switch, interlocking switch and other parts in the controlling circuit.

I claim:

1. In controlling mechanism for alternating electric machines, the combination of a compensator comprising coils and a variable magnetic circuit, a switch for connecting said coils in circuit with a controlled machine, means for closing said switch and then varying said magnetic circuit, and means for controlling the speed of operation of said last named means.

2. In controlling mechanism for alternating electric machines, the combination of a compensator comprising coils and a variable magnetic circuit, starting and running contacts, means for closing the starting contacts, varying the magnetic circuit and closing the running contacts in the order named and means for retarding the operation of said means last mentioned.

3. In controlling mechanism for alternating electric machines, the combination of a compensator comprising coils and a variable magnetic circuit, a switch to place the coils in circuit with a controlled machine, mechanical means for closing said switch and varying said magnetic circuit and means for controlling the speed of operation of said mechanical means.

4. In controlling mechanism for alternating electric machines, the combination of a compensator comprising coils and a variable magnetic circuit, starting and running contacts, operating means for closing the starting contacts, varying the magnetic circuit and closing the running contacts in the order named, means for retarding the action of said operating means and means for rendering said retarding means inoperative when the mechanism is going to off position.

5. In controlling mechanism for alternating electric machines, the combination of a compensator comprising coils and a variable magnetic circuit, contacts for connecting said coils in line circuit to a controlled machine, operating means for closing said contacts and varying said magnetic circuit, a motor device for said operating means, a controlling circuit therefor and a switch to control said controlling circuit.

6. In controlling mechanism for alternating electric machines, the combination of a compensator comprising coils and a variable magnetic circuit, contacts for connecting said coils in line circuit to a controlled machine, operating means for closing said contacts and varying said magnetic circuit, a motor device for said operating means, a controlling circuit therefor, an auxiliary switch in said controlling circuit, a combined automatic and manually operated master switch in said circuit and means actuated by said motor device serving near the end of the starting operation to open said auxiliary switch, to cause said master switch to open.

7. In controlling mechanism for alternating electric machines, the combination of a compensator comprising coils and a variable magnetic circuit, contacts for connecting said coils in line circuit to a controlled machine, operating means for closing said contacts and varying said magnetic circuit, a motor device for said operating means, a controlling circuit therefor, an independent power circuit for energizing said motor device, a switch therein, an operating magnet for said switch in said controlling circuit and a manually operated switch for closing said controlling circuit.

8. In controlling mechanism for alternating electric machines, the combination of a compensator comprising coils and a variable magnetic circuit, contacts for connecting said coils in line circuit to a controlled machine, operating means for closing said contacts and varying said magnetic circuit, a motor device for said operating means, a controlling circuit therefor, a master switch and an auxiliary switch in said controlling circuit, automatic means for opening said auxiliary switch to open said master switch as soon as the device reaches running position, a controlling magnet placed across the motor circuit by closing of the starting contacts, and a detent for the operating means operated by said controlling magnet.

9. In controlling mechanism for alternating electric machines, the combination of a compensator comprising coils and a variable magnetic circuit, main motor switches for two running directions, operating means to close said switches for either direction of running and thereafter varying said magnetic circuit and means for retarding the action of said operating means.

10. In controlling mechanism for alternating electric machines, the combination of a compensator comprising coils and a variable magnetic circuit, starting and running contacts for forward running, starting and running contacts for reverse running, operating means for closing either set of starting contacts, varying the magnetic circuit and then closing the corresponding running contacts for either direction of running and means for retarding the action of said operating means.

11. In controlling mechanism for alternating electric machines, the combination of a compensator comprising coils and a variable magnetic circuit, starting and running contacts for forward running and for reverse running, operating means for closing a set of starting contacts for running in either direction, varying said magnetic circuit and closing the corresponding running contacts in the order named, an electric motor device for actuating said operating means, a controlling circuit therefor, and manually operated switches in said circuit for controlling the motor device to effect starting in either direction.

12. In controlling mechanism for alternating electric machines, the combination of a compensator comprising coils and a variable magnetic circuit, starting and running contacts for forward running and for reverse running, operating means for closing a set of starting contacts for running in either direction, varying said magnetic circuit and closing the corresponding running contacts in the order named, an electric motor device for actuating said operating means, a controlling circuit therefor, a relay switch in said circuit, an auxiliary switch and a master switch in an operating circuit to operate said relay switch, and switches in said operating circuit to control the position of said relay switch, the closing of said master switch being effective to move the controller to running position for either direction of running.

13. In controlling mechanism for alternating electric machines, the combination of a compensator comprising coils and a variable magnetic circuit, starting and running contacts for forward running and for reverse running, operating means for closing a set of starting contacts for running in either direction, varying said magnetic circuit and closing the corresponding running contacts in the order named, an electric motor device for actuating said operating means, a controlling circuit therefor, manually operated switches in said circuit for controlling the motor device to effect starting in either direction, an auxiliary switch in said controlling circuit and means whereby said operating means open said auxiliary switch toward the end of the starting action in either direction.

14. In controlling mechanism for alternating electric machines, the combination of a compensator comprising coils and a variable magnetic circuit, starting and running contacts for forward running and for reverse running, operating means for closing a set of starting contacts for running in either direction, varying said magnetic circuit and closing the corresponding running contacts in the order named, an electric motor device for actuating said operating means, a controlling circuit therefor, manually operated switches in said circuit for controlling the motor device to effect starting in either direction, an independent power circuit for said motor device, switches therein for either direction of operation, operating coils for said switches in said operating circuit controlled by said manual switches to close said power circuit and energize the motor device to actuate the operating means in either direction.

15. In controlling mechanism for alternating electric machines, the combination of a compensator comprising coils and a variable magnetic circuit, starting and running contacts, an operating motor and switches to control said motor, operating means actuated thereby for closing said starting contacts, varying said magnetic circuit and closing said running contacts in the order named, a shunt connected across the main power circuit on the motor side thereof, a controlling magnet therein, energized upon closing of the starting contacts to actuate a running position detent, a plurality of switches in said shunt circuit, the opening of any one of which will interrupt said circuit and deënergize said controlling magnet to release the detent, and overload relays placed in the main line circuit by closing of the running contacts, one or more of said relays being arranged to operate one or more of said switches in said first named shunt circuit.

16. In a controller for electric motors, the combination of a compensator, a main line circuit for the controlled motor, starting contacts to connect the compensator electrically with the motor through said line, running contacts to connect the motor on the line and substantially eliminate the compensator, an operating device and means actuated thereby to close the starting contacts, operate the compensator to vary its magnetic circuit and close the running contacts in the order named, a controlling magnet, a circuit therefor to energize said magnet when said starting contacts are closed, means actuated by said magnet to retain the parts in running position after the running contacts are closed, a switch in said magnet circuit, an electric motor device to actuate said operating member, a controlling circuit therefor, a contact in said circuit and a manually actuated device to close said contact, a detent for said manual device, and means for releasing the detent.

17. In a controller for electric motors, the combination of a compensator, a main line circuit for the controlled motor, forward and reverse starting contacts to connect the compensator electrically with the motor through said line, forward and reverse running contacts to connect the motor on the line and substantially eliminate the compensator, an operating device and means actuated thereby for either running direction to close the starting contacts, operate the compensator to vary its magnet circuit and close the running contacts in the order named, a controlling magnet, a circuit therefor to energize said magnet when said starting contacts are closed, means actuated by said magnet to retain the parts in running position after the running contacts are closed, a switch in said magnet circuit, an electric motor device to actuate said operating member, a controlling circuit therefor, a contact in said circuit and a manually actuated device to close said contact, and a detent for said manual device, and means for releasing the detent.

18. In a controlling device for electric motors, the combination of a compensator comprising coils and a variable magnetic circuit, a line switch, a spring tending to maintain the magnetic circuit closed and the switch open, mechanical means for closing the switch and opening the magnetic circuit, a time-limit device for retarding such operations, a detent for holding said magnetic circuit open and switch closed, a no-voltage-release magnet for actuating the detent and being energized upon closing said switch, and manually operated means for operating said detent.

19. In a controlling device for electric motors, the combination of a compensator comprising coils and a variable magnetic circuit, a line switch, a spring to maintain the magnetic circuit closed and the switch open when in the off-position, mechanical means for first closing said switch and then varying said magnetic circuit, a time-limit device for retarding such operations, a detent for holding said parts in running position, a no-voltage-release magnet energized upon closing of said switch for actuating said detent, a switch in said no-voltage-release magnet circuit to interrupt same upon occurrence of an overload, an overload relay to operate said switch, and means for operating said detent manually.

20. In a controlling device for electric motors, the combination of compensating coils and a magnetic circuit having a movable part, a starting switch, a running switch, an operating member, mechanical means actuated by said member for closing said starting switch, moving said movable part, and closing said running switch, and a dash-pot and plunger to regulate the time required in such operations.

21. In a controlling device for electric motors, the combination of compensating coils and a magnetic circuit having parts relatively movable, two switches for operating a motor in opposite directions of rotation and mechanical means for closing one of said switches and opening said magnetic circuit to operate said motor in one direction of rotation and to close the other of said switches and open said magnetic circuit to operate the motor in reverse direction of rotation.

CLEVELAND REDFIELD.

Copies of this patent may be obtained for five cents each, by addressing the "Commissioner of Patents, Washington, D. C."